(12) United States Patent
Ramappa et al.

(10) Patent No.: US 11,310,735 B2
(45) Date of Patent: *Apr. 19, 2022

(54) APPARATUS TO SAVE POWER SMARTLY FROM BLUETOOTH AUDIO VISUAL REMOTE CONTROL PROTOCOL NOTIFICATIONS

(71) Applicant: Avago Technologies International Sales Pte. Limited, Singapore (SG)

(72) Inventors: Raghavendra Ramappa, Bengaluru (IN); Ravi Nagarajan, Bengaluru (IN); Avish Vijaykumar Shah, San Francisco, CA (US)

(73) Assignee: Avago Technologies international Sales Pte. Limited, Singapore (SG)

(*) Notice: Subject to any disclaimer, the term of this patent is extended or adjusted under 35 U.S.C. 154(b) by 38 days.

This patent is subject to a terminal disclaimer.

(21) Appl. No.: 16/674,006

(22) Filed: Nov. 5, 2019

(65) Prior Publication Data

US 2020/0068491 A1    Feb. 27, 2020

Related U.S. Application Data

(63) Continuation of application No. 15/796,389, filed on Oct. 27, 2017, now Pat. No. 10,477,471.

(51) Int. Cl.
*G08C 17/00*    (2006.01)
*H04W 52/02*    (2009.01)
(Continued)

(52) U.S. Cl.
CPC ....... *H04W 52/0209* (2013.01); *H04L 65/605* (2013.01); *H04L 65/4069* (2013.01); *H04W 4/80* (2018.02); *H04W 84/12* (2013.01)

(58) Field of Classification Search
CPC ... H04W 52/0209; H04W 4/80; H04W 84/12; H04L 65/605; H04L 65/4069;
(Continued)

(56) References Cited

U.S. PATENT DOCUMENTS 9,277,255 B1 * 3/2016 Rowe ................. H04N 21/6582
9,326,012 B1 * 4/2016 Dorwin .............. H04N 21/4405
(Continued)

OTHER PUBLICATIONS

Advanced Audio Distribution Profile Specification, Audio Video Working Group, pub Jul. 14, 15, pp. 1-75.

*Primary Examiner* — Stephen M D Agosta
(74) *Attorney, Agent, or Firm* — Morgan, Lewis & Bockius LLP

(57) ABSTRACT

System, method and computer-readable storage medium including, a first communications device including a host processor to wake up upon receipt of a message and stream audio directly to another device via wireless communication, a second communications device including circuitry to control the streaming of the audio by sending messages to the first communications device and to control a display. The host processor of the first communications device enters a sleep stale during audio streaming while a state of the display is off. Reduction in the number of messages sent by the second communications device, or offloading, of message handling by the host processor, allows the host processor to remain in a steep state for longer periods.

20 Claims, 8 Drawing Sheets

(51) Int. Cl.
*H04L 65/60* (2022.01)
*H04L 65/61* (2022.01)
*H04W 84/12* (2009.01)
*H04W 4/80* (2018.01)

(58) Field of Classification Search
CPC ........... H04M 1/6066; H04M 2250/02; H04M 1/6025; H04M 1/72513; H04B 1/713; Y02D 30/70; Y02D 70/142; Y02D 70/144; Y02D 70/1262
See application file for complete search history.

(56) References Cited

U.S. PATENT DOCUMENTS

| | | | |
|---|---|---|---|
| 9,384,271 | B1 | 7/2016 | Goldin et al. |
| 9,768,974 | B1* | 9/2017 | Lewis .................... H04L 51/32 |
| 9,826,529 | B1* | 11/2017 | Jorgovanovic ........ H04L 5/1461 |
| 10,212,474 | B2* | 2/2019 | Xu .................... H04N 21/4367 |
| 10,491,964 | B2* | 11/2019 | Kellar .............. H04N 21/64322 |
| 10,609,030 | B1* | 3/2020 | Newstadt .......... H04W 12/1202 |
| 10,838,691 | B2* | 11/2020 | Geng ...................... G06F 3/165 |
| 2002/0023237 | A1 | 2/2002 | Yamada et al. |
| 2005/0075148 | A1* | 4/2005 | Park .................. H04W 52/0216 455/574 |
| 2007/0247449 | A1 | 10/2007 | Mack et al. |
| 2008/0261524 | A1 | 10/2008 | Grushkevich |
| 2008/0287063 | A1 | 11/2008 | Kidron et al. |
| 2010/0142500 | A1* | 6/2010 | Sudak ............... H04W 72/1215 370/338 |
| 2010/0292821 | A1 | 11/2010 | Mehta |
| 2010/0299700 | A1 | 11/2010 | Choi et al. |
| 2012/0275618 | A1 | 11/2012 | Tan et al. |
| 2014/0009334 | A1 | 1/2014 | Lee et al. |
| 2014/0064695 | A1 | 3/2014 | Cho et al. |
| 2014/0095669 | A1 | 4/2014 | Kang |
| 2014/0119407 | A1 | 5/2014 | Miller et al. |
| 2014/0130073 | A1 | 5/2014 | Yu et al. |
| 2014/0161274 | A1 | 6/2014 | Singamsetty et al. |
| 2014/0240755 | A1* | 8/2014 | Pizot .................... G06F 3/1229 358/1.15 |
| 2014/0293145 | A1* | 10/2014 | Jones ...................... G06F 3/044 349/12 |
| 2015/0043427 | A1 | 2/2015 | K.M. |
| 2015/0133056 | A1 | 5/2015 | Kang et al. |
| 2015/0228000 | A1* | 8/2015 | Bijor .................. H04W 12/068 705/13 |
| 2016/0018959 | A1 | 1/2016 | Yamashita et al. |
| 2016/0286337 | A1* | 9/2016 | Thekkedathu Sivaraman ............. H04L 65/1069 |
| 2016/0379472 | A1 | 12/2016 | Schuler et al. |
| 2017/0078962 | A1 | 3/2017 | Hassan et al. |
| 2017/0094677 | A1* | 3/2017 | Liu .................. H04W 72/0446 |
| 2018/0184152 | A1 | 6/2018 | Kirkpatrick et al. |

* cited by examiner

APPARATUS TO SAVE POWER SMARTLY FROM BLUETOOTH AUDIO VISUAL REMOTE CONTROL PROTOCOL NOTIFICATIONS

CROSS-REFERENCE TO RELATED APPLICATIONS

The present application is a continuation of U.S. application Ser. No. 15/796,389, filed Oct. 27, 2017, now U.S. Pat. No. 10,477,471, the entire contents of which are incorporated herein by reference.

FIELD OF DISCLOSURE

The present disclosure relates generally streaming high-quality audio between Bluetooth devices and control of the streaming to save power.

BACKGROUND

Portable devices such as smartphones, tablets, portable digital assistants (PDA), portable music players, book readers, and laptop computers have become popular devices for playing high-quality audio. Along with these devices, it is also popular to listen to and control the audio by way of a wireless device that wirelessly communicates with the portable device. Such wireless audio devices may include headsets, earphones, hearing aid devices, wearables, or car kits. Short range wireless communications for communication between the portable devices and wireless audio devices may include WiFi Direct and Bluetooth (BT). Among types of wireless communications, Bluetooth (BT) includes profiles for streaming audio between devices and for control of the state of streaming. The Advanced Audio Distribution Profile (A2DP) defines the protocols and procedures to stream high-quality mono or stereo audio between BT devices. This profile relies on Audio/Video Distribution Transport Protocol (AVDTP) to stream audio over an L2CAP channel. Since a stream represents unidirectional media data, the devices assume roles of source (SRC) and sink (SNK). The audio stream generating entity is the SRC whereas the consuming device is the SNK. The Audio/Video Remote Control Profile (AVRCP) is used in conjunction with A2DP for remote control on devices such as headphones, Car-Kits and wearable devices.

The Audio Video Remote Control Profile (AVRCP) in BT may be used to control A2DP state using different commands, notifications and events. The profile adopts the AV/C device model and command format for control messages, and those messages are transported by the Audio/Video Control Transport Protocol (AVCTP), Usage Examples are: play/pause/next/stop commands, play position change/file-name change/audio volume change etc. are notifications. Similar to A2DP, AVRCP defines Controller (CT) and Target (TG) roles. The CT is a device that initiates a transaction by sending a command frame to a target and the TG is a device that receives a command frame and accordingly generates a response frame. The A2DP focuses on audio streaming while AVRCP is mainly used to control, browse media contents and its states.

A2DP profile establishes signaling and a media session between BT devices, AVRCP is a profile that is used to control (start/stop) the A2DP session and to observe progress of A2DP session, such as play progress, volume change, play file change and browsing of files.

Notifications generated by AVRCP while Bluetooth (BT) audio is streaming are huge. Even with BT audio offloaded to a BT controller, AVRCP notifications cause the host processor to awake. Subsequently, notifications generated by AVRCP consume portable device battery. Also, AVRCP Notifications are generated without user knowledge or checking status of the remote host processor.

From the perspective of the wireless audio device, the huge number of AV RCP notifications generated from the portable device causes battery drain in the low power designed wireless audio device. The portable device generates notifications without knowledge or necessity in the wireless audio device. Thus, although AVRCP Notifications are very important messages between wireless communications devices while A2DP audio streaming, there is a need to save battery consumption in the devices during notifications.

Although aspects of the present disclosure relate to Bluetooth, wireless communication by way of other standards such as WiFi Direct may benefit from reduced battery consumption by applying the aspects of the present disclosure.

The foregoing "Background" description is for the purpose of generally presenting the context of the disclosure. Work of the inventors, to the extent it is described in this background section, as well as aspects of the description which may not otherwise qualify as prior art at the time of filing, are neither expressly nor impliedly admitted as prior art against the present invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
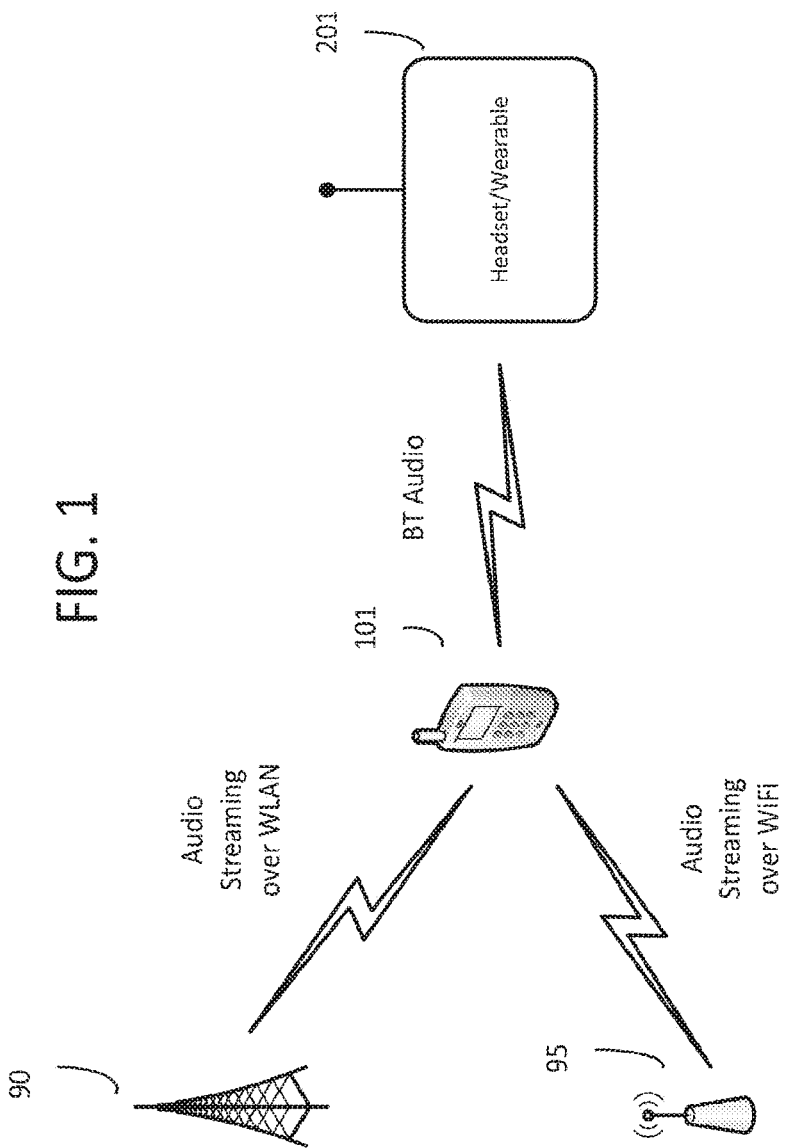
FIG. 1 is a block diagram of a network including a smartphone and Bluetooth radio devices in accordance with an exemplary aspect of the disclosure.

Referring now to the drawings, wherein like reference numerals designate identical or corresponding parts throughout several views, the following description relates to alternative approaches to reducing power usage where A2DP and AVRCP profiles stream audio between BT connected devices.

Regarding FIG. 1, audio signals may be streamed either by way of audio previously stored in a portable device 101, by way of streaming from a large access point 90 over a wireless carrier, such as the Internet or cellular, or by way of streaming over the Internet by way of a local access point 95. Wireless audio devices 201 can wirelessly communicate with the portable device 101 to allow the user to listen to the audio playback that is transmitted from the portable device.

Figure 2:
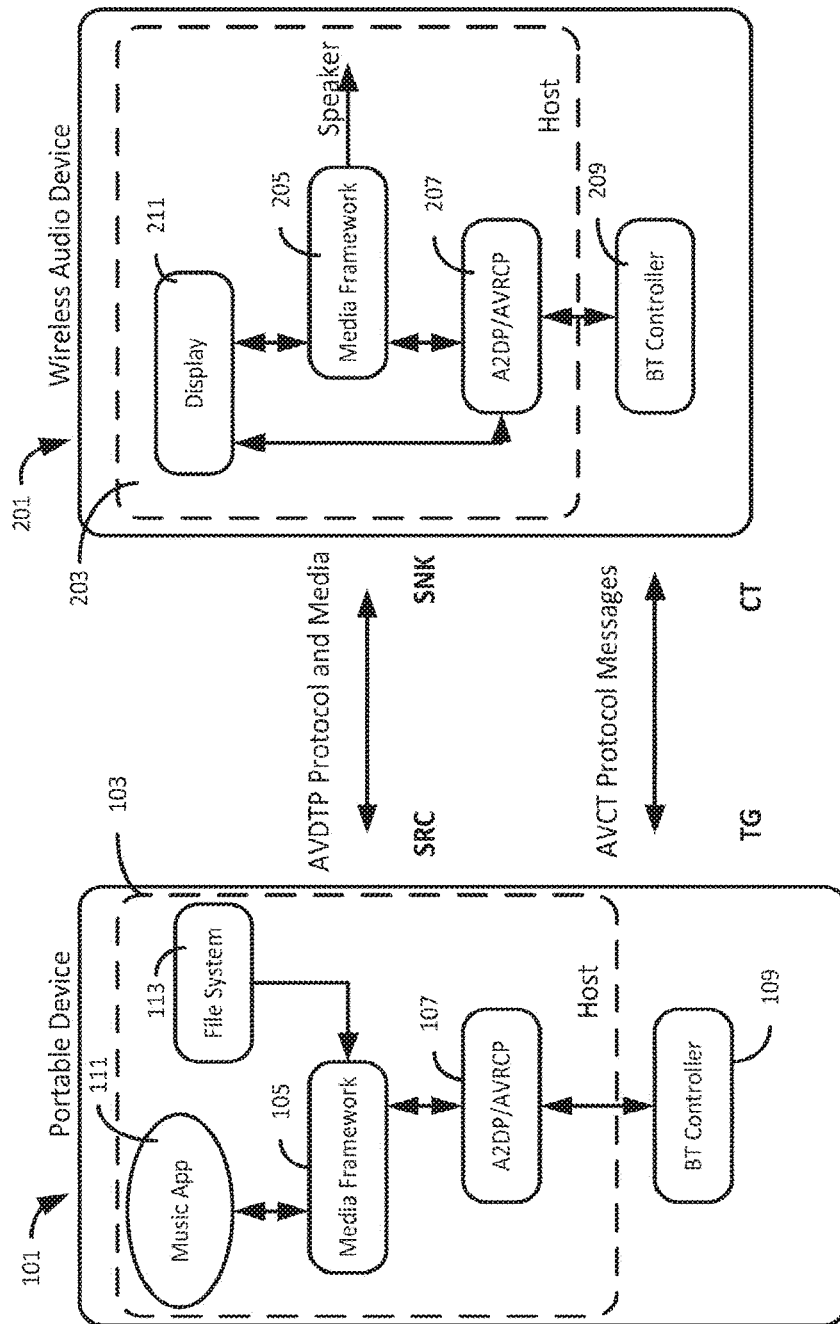
FIG. 2 is a block diagram of exemplary Bluetooth connected devices according to an aspect of the disclosure.

Regarding FIG. 2, when a BT connection is made between two devices 101, 201, A2DP and AVRCP profiles establish the connection between the two devices. BT enabled devices have a BT controller that is separate from a host processor. For example, portable device 101 has a hardware architecture in which the host processor 103 and BT controller 109 are separate, where major software components execute as part of the host processor. A2DP/AVRCP profiles 107 may be part of the host processor 103 along with media framework (codecs) 105, file system 113 and music application 111 to start/stop file playback. The BT controller 109 is a less battery extensive hardware piece that runs most of BT firmware and physical layer protocols.

The media framework 105 reads the contents to be streamed from the file system 113, encodes according to AVDTP signaling and, with the AVDTP and L2C headers, sends streams over the air via the BT controller 109. A device 201 serving as a SNK receives the audio streams via its own BT controller 209. The device 201 may include a display 211, media framework 205, A2DP/AVRCP profiles 207 that are controlled by a host processor 203 which is separate from the BT controller 209. The media framework 205 may output audio to a speaker and may output messages or video to display 211.

An aspect of reducing battery power consumption may be an architecture in which the audio frames encoding responsibility is shifted from main host processor to a co-processor. In such architecture, the battery hungry host processor can be put into sleep state while A2DP audio streaming is in progress. The co-processor may pump encoder A2DP frames to BT controller via a hardware interface without intervention of host processor. The co-processor will be controlled from the host processor on A2DP signaling events. Via this architecture, portable devices can reduce their battery consumption. Via this architecture, only AVRCP runs in the host processor and updates audio playing progress information. There is a need for further reduction in power consumption by the host processor.

According to AVRCP, a CT requests information of changes of a variety of items like playback position, playback status, track change, volume change, now playing list change, etc. In addition, for each request the CT receives information of the changes. In particular, AVRCP mandates three handshaking sequences between CT and TG.
1. RegisterNotification command
2. RegisterNotification Interim response
3. RegisterNotification Changed response All AVRCP notifications follow this notification sequence. These notifications use a lot of power as power is used each time the Host is waked up on TG and notification information is requested.

Figure 3:
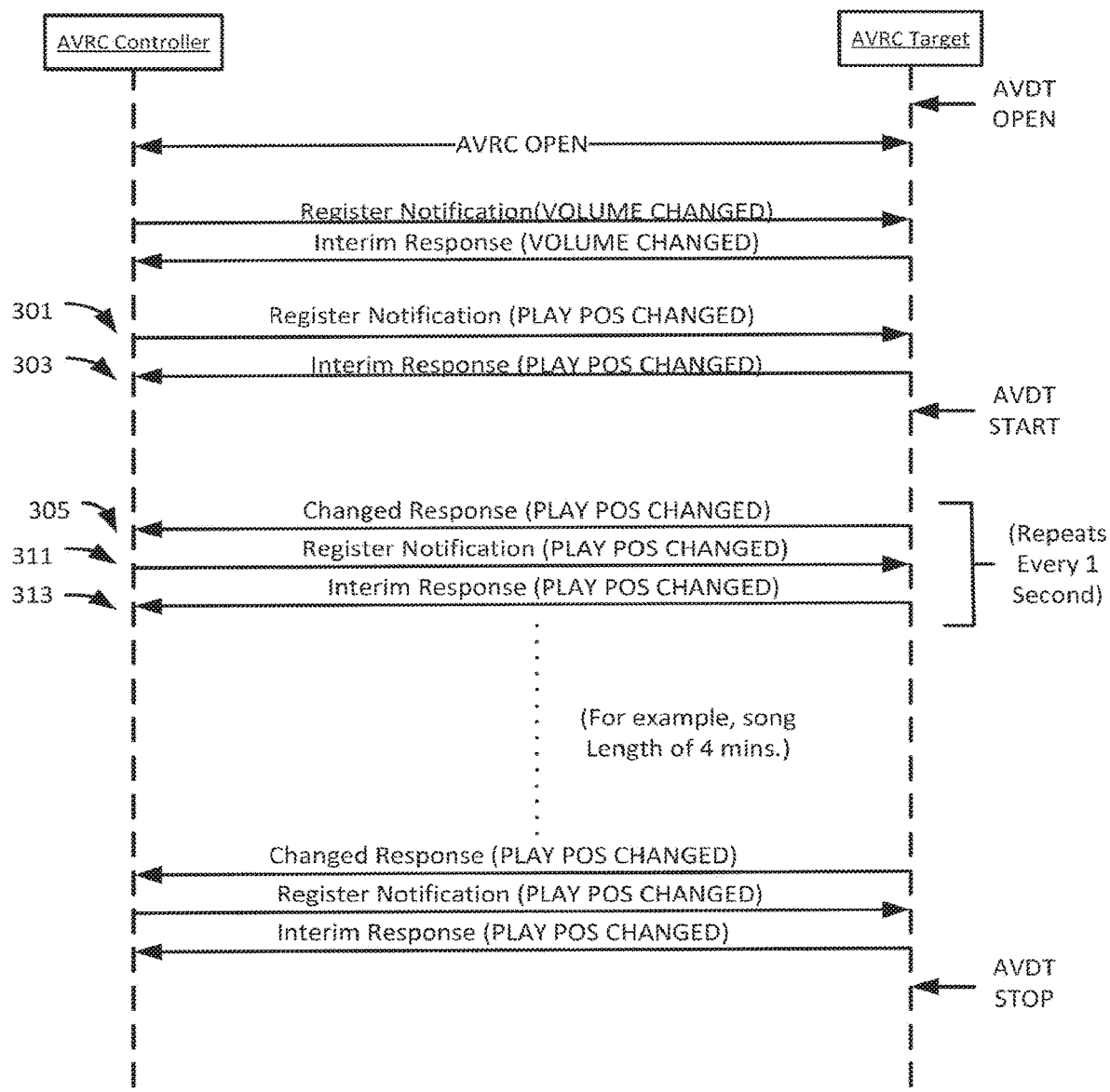
FIG. 3 is a sequence diagram of an AVRC Notification Sequence according to an exemplary aspect of the disclosure.

FIG. 3 is a sequence diagram that illustrates an example AVRCP Notification Sequence according to an exemplary aspect of the disclosure. Regarding FIG. 3, a lot of notifications may be sent over the course of audio streaming. In the example, to get a play position change notification, CT 209 sends a RegisterNotification command 301 and receives an acknowledgement from the TG 109 as an interim Response 303. Next, over the duration of playing a song, every time play position changes in TG (usually every second), the TG 109 sends a Changed Response 305 to the CT 209. Each change is followed again by a RegisterNotification command 311 and an Interim response 313 until audio streaming is completed (AVDT STOP).

Figure 4:
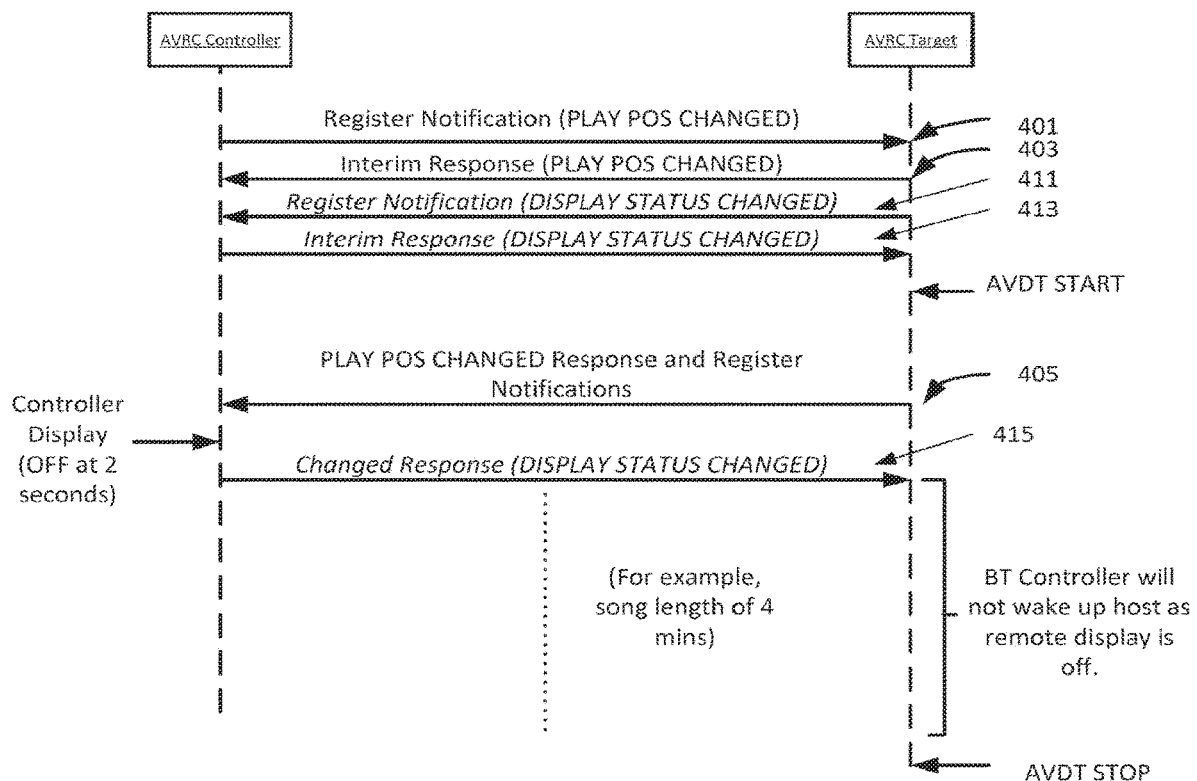
FIG. 4 is a sequence diagram of a new event to monitor display status of an AVRC controller according to an exemplary aspect of the disclosure.

An aspect of reducing power consumption may be to introduce a new event among actions that are controlled or monitored over the course of streaming audio. FIG. 4 is a sequence diagram that illustrates an example of the introduction of a new event to monitor display status of an AVRC controller according to an exemplary aspect of the disclosure. Regarding FIG. 4, a new event may be a change in status of display 211 of the wireless audio device 201.

An initial handshake may be performed for a regular event, such as a change in play position, which includes the controller CT sending a Register Notification message 401 and the target TG responding with an Interim Response message 403 to register the play position changed event. The new event may be initiated by the portable device 101 as a request to monitor status of the display 211. The new AVRCP event may be registered by a handshaking sequence in which the target TG sends a Registration Notification "DISPLAY_STATUS_CHANGED" 411 to controller CT which invokes an Interim Response 413. The audio streaming will start according to the AVDT protocol. The target TG will notify of a play position change 405. At some point during audio streaming, the controller CT may be informed that the display 211 will be turned off, for example after two seconds. The controller CT will notify the target TG of the change in display status by a Changed Response notification message 415. Subsequently, provided the notification of changed status "Changed Response" 415, the BT controller 109 will not wake up the host 103 to send further notifications, as the remote display 211 is off.

Introduction of a new event, such as display status changed reduces the number of notifications and saves battery consumption. During the period offline that the audio is being transmitted while the display 211 is off, the BT controller will nut wake up the host processor 103 of the TG device 101 to send and receive notification messages with the CT device 201. The host processor of the TG device will remain in a sleep state and use less battery power.

Figure 5:
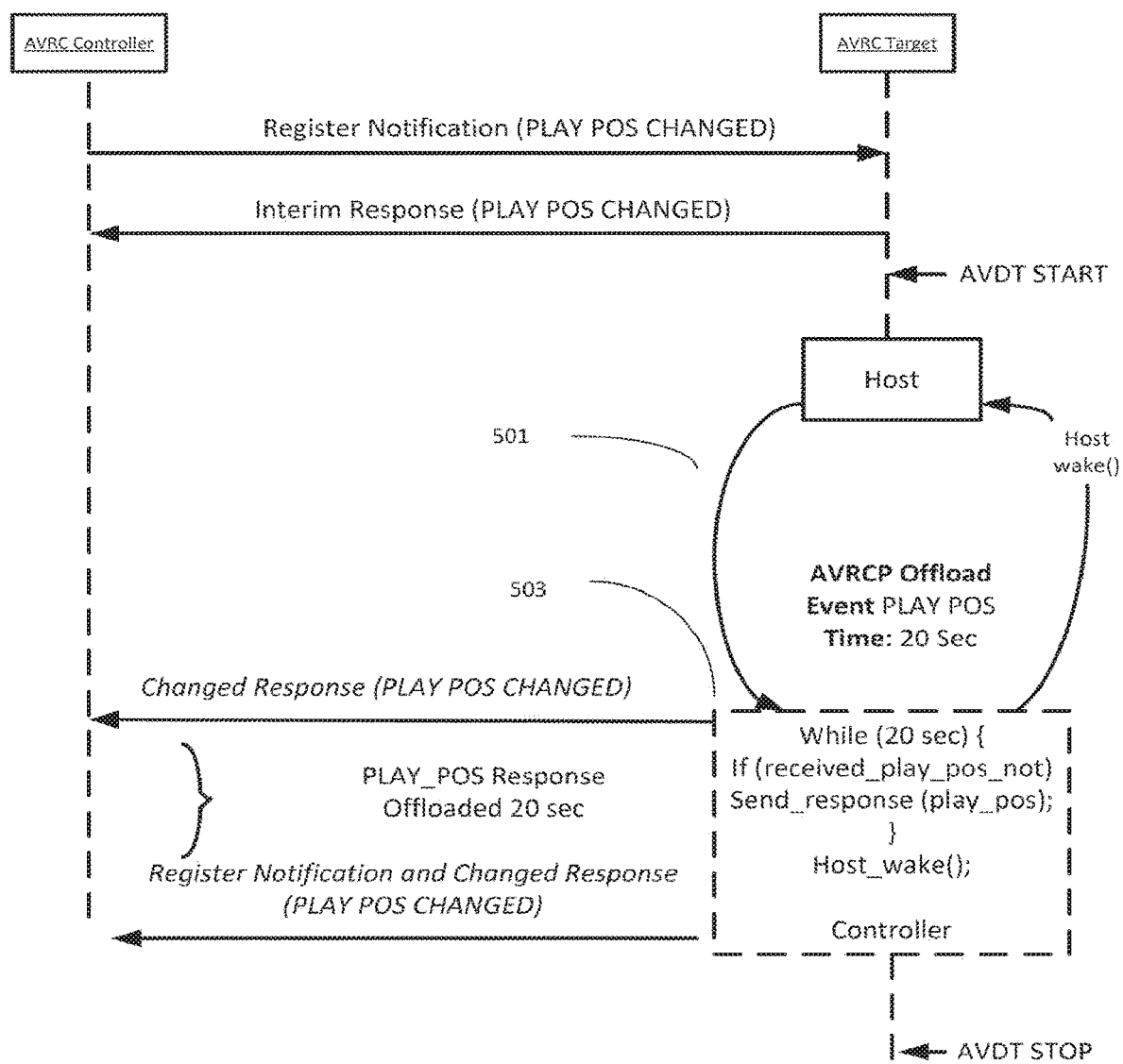
FIG. 5 is a sequence diagram of a controller offloaded event notification according to an exemplary aspect of the disclose.

An aspect of reducing power consumption may be to offload processing from the host processor to the controller during audio transmission. FIG. 5 is a sequence diagram that illustrates offloading processing of notifications to a controller according to an exemplary aspect of the disclosure. Regarding FIG. 5, an aspect is to offload handling of an event to the BT controller for a predetermined period. For example, an event, Play Position, may be offloaded to a BT controller of the TG for a predetermined period of 20 seconds. In such case, the host processor 103 does not send or receive notifications with respect to Play Position notification for 20 seconds. Instead, the TG host processor 103 invokes a vendor specific command 501 to offload handling of the event. The vendor specific command may be a command associated with the particular host processor to have a block of code performed by the specific controller. The TG BT controller 109 handles the Register Notification PLAY POS event 503 by processing the block of code for the predetermined period. Power consumption by the battery of the AVRCP Target 101 can be reduced by not involving the host processor 103 in processing notifications for a predetermined period. Instead, the lower power BT controller 109 performs the offloaded event handling for the predetermined period. The host processor may be waked after completion of the predetermined period.

An aspect is offloading AVRCP notification depending on a change in status of display 211. The AVRC Target TG may initiate an event as a request to monitor status of the display 211. The request may be registered by a handshaking sequence in which the target TG sends a Registration Notification "DISPLAY_STATUS_CHANGED" to controller CT which invokes an Interim Response. The audio streaming will start according to the AVDT protocol. At some point during audio streaming, the controller CT may be informed that the display 211 will be turned off, for example after two seconds. The controller CT will notify the target TG of the change in display status by a Changed Response notification message. Subsequently, provided the notification of changed status event "Changed Response", the TG host processor 103 invokes a vendor specific command 501 to offload handling of the event. The TG BT controller 109 handles the Register Notification DISPLAY STATUS CHANGED event by processing the block of code for the predetermined period. Power consumption by the battery of the AVRCP Target TG 101 can be reduced by not involving the host processor 103 in processing notifications for a predetermined period. Instead, the lower power BT controller 109 performs the offloaded event handling for the predetermined period, for example by handling play position notifications. The host processor may be waked after completion of the predetermined period.

Figure 6:
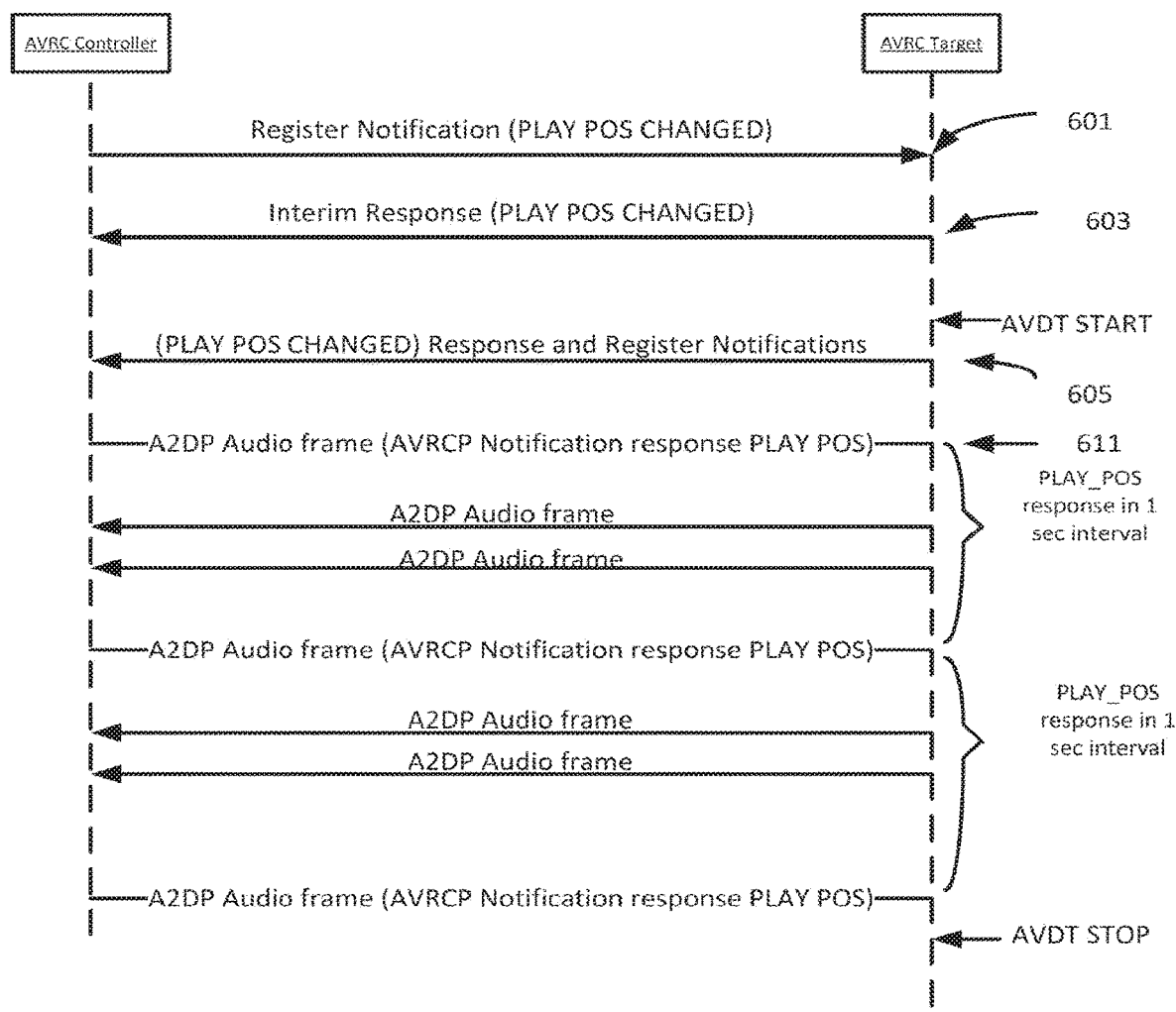
FIG. 6 is a sequence diagram of A2DP frames piggy-backed with AVRC notifications according to an exemplary aspect of the disclosure.

An aspect is to piggyback audio frames with notification messages so that fewer notification messages are separately transmitted. FIG. 6 is a sequence diagram that illustrates an example in which A2DP frames are piggybacked with AVRC notifications according to an exemplary aspect of the disclosure. Regarding FIG. 6, an aspect is AVRCP PLAY POS Notification responses are piggybacked with A2DP frames every 1 second, where A2DP frames are sent out every 20 ms. An initial handshaking sequence is performed in which a Register Notification message 601 is sent to the target TG to request information such as that the play position has changed, and the target TG responds with an interim Response message 603. Alter the initial handshake, the streaming of audio may be started according to the AVDT protocol. As play position changes, the target TG responds with a notification message 605 to the controller CT. Then subsequent notifications are periodically (for example one second intervals) piggybacked in Audio frames 611 transmitted according to A2DP. A2DP frames that are piggybacked with AVRCP notification messages may be adjusted in length to accommodate the notification message. This aspect avoids a greater number of transactions from different levels of the Bluetooth stack and air time.

In order to implement this aspect of piggybacking AVRCP notifications with A2DP frames, the media framework 105 may be modified to accommodate different size frames. However, the grain intention of reducing battery consumption will be served with this aspect. An example implementation of piggybacking may be to link a co-processor or audio offload with a media player index.

An aspect is to bundle different AVRCP notifications so that the host processor will be waked fewer times. Instead of a Register Notification and Interim Response handshake sequence for each type of notification, a single Register Notification acid interim Response handshake sequence may be made for several notifications. For example, a Register Notification and Interim Response handshake sequence may be made for a group of notifications including VOLUME CHANGED, PLAY POSITION CHANGED, DISPLAY STATUS CHANGED. The handshaking signals for the registration sequence can be reduced by avoiding the registration notification/interim response sequence each time a change happens. Instead, over the course of song length, changed response notifications for the group of notifications such as volume change notification and play position change notification can be sent by the target TG at regular intervals.

Figure 7:
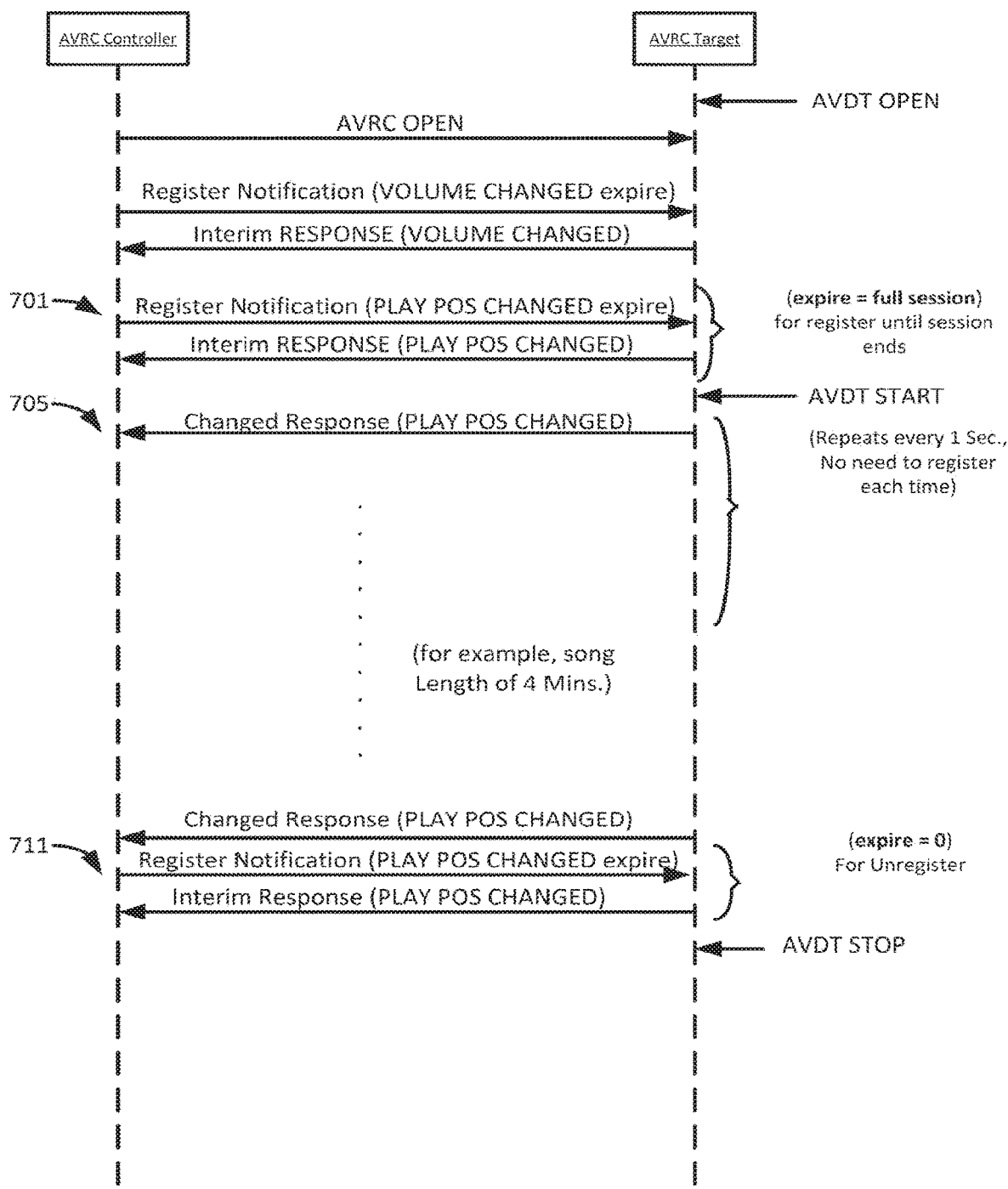
FIG. 7 is a sequence diagram of an expire parameter for register notification according to an exemplary aspect of the disclosure.

An aspect to reduce power consumption may be to add an expire parameter to a notification message. The expire parameter may allow a host processor to skip sending of notification messages for an optional period. FIG. 7 is a sequence diagram that illustrates an example of adding an expire parameter to the Register Notification message according to an exemplary aspect of the disclosure. Regarding FIG. 7, an aspect is a new AVRCP Register Notification parameter "expire" that can be added to the Registration Notification message 701 during a handshaking sequence. In the example, the expire parameter may have one of three values: "−1" (registration remains effective for the full audio session); "x" (registration remains effective for a specified x seconds): "0" (end registration). In the example, handshaking signals for the registration sequence can be reduced by avoiding the registration notification/interim response sequence each time the change happens. Instead, over the course of song length of 4 minutes, a changed response notification such as play position change notification 705 can be sent by the target TG each 1 second interval. The handshaking operation is reset upon sending a Register Notification with the expire parameter set to "0" 711. Power consumption may be reduced by avoiding the handshaking operation each time a change occurs.

Figure 8:
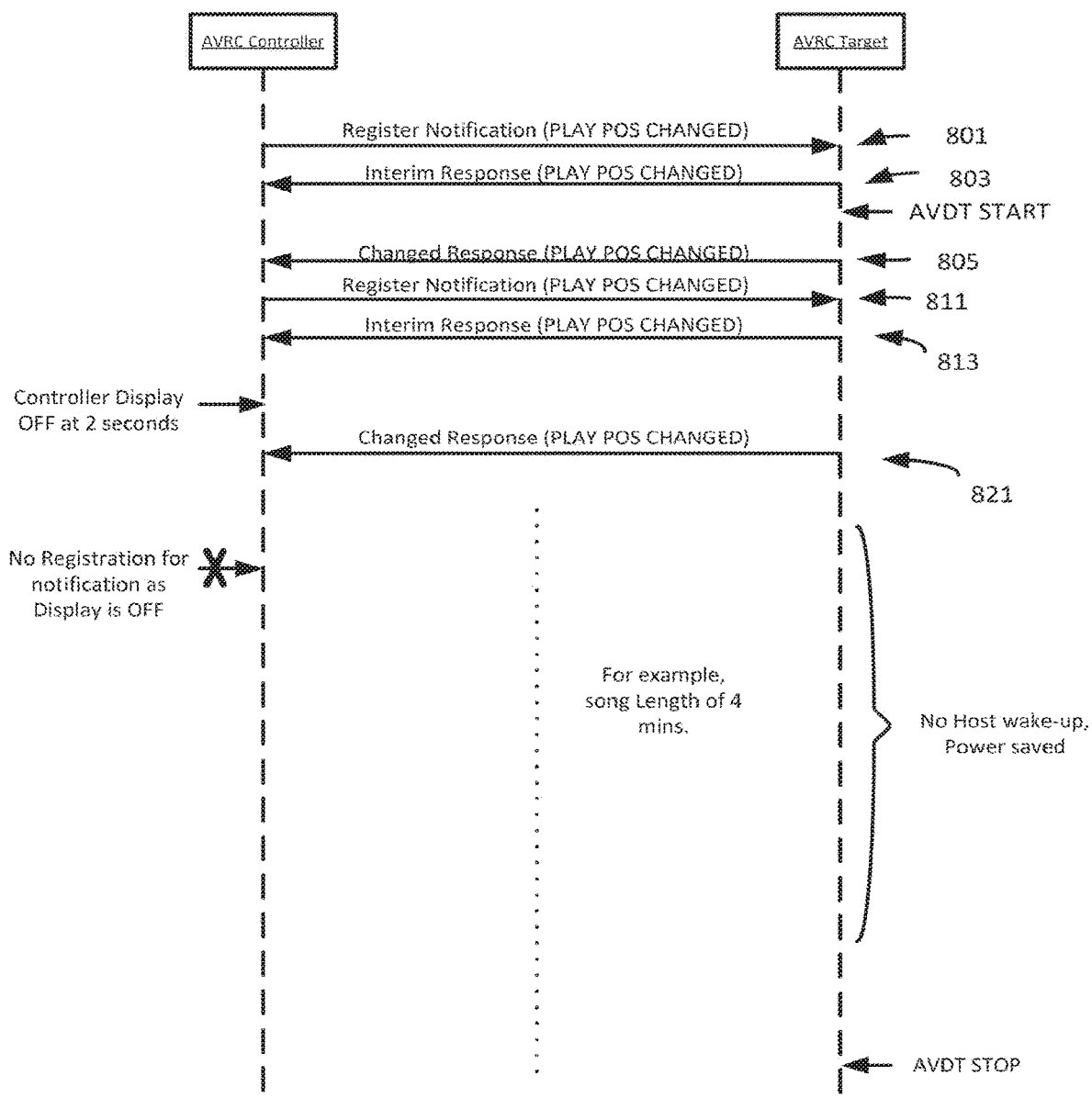
FIG. 8 is a sequence diagram of an AVRCP CT identifying display status in a BT controller according to an exemplary aspect of the disclosure.

An aspect to reduce power consumption by including a function in the controller CT of identifying the status of the display 211. In this aspect, during the period that the display 211 is off, the controller CT does not send a Register Notification message. FIG. 8 is a sequence diagram that illustrates an example in which the AVRCP CT identifies the display status in a BT controller according to an exemplary aspect of the disclosure. Regarding FIG. 8, an initial handshake occurs in which a Register Notification message 801 is sent to the target TG requesting notification that play position has changed. The target TG responds with an Interim Response message 803. After completion of the initial handshake the audio streaming begins using the AVDT protocol. When the play position changes, the target TG sends a Changed Response notification message 805. Another handshaking sequence 811, 813 is performed to again request notification of a play position change. At some point during audio streaming, the controller CT may identify that the display will be turned off, for example in two seconds. A response to the previous handshake will be performed by the target TG through sending of a Changed Response notification message 821. However, because the status of display 211 is off, the controller CT will not initiate another handshake. Without any further handshakes requesting notification by the target, the host processor of the target TG may remain in a sleep slate, and not be waked up by a request notification from the controller CT. Subsequently, power is saved while the host processor of the target TG is in a sleep state. Power may be saved by this aspect of control of AVRCP notifications whenever the status of the display 211 is off.

The above alternative approaches may be implemented in various ways. Other events may be monitored such as a new AVRCP subscribe event to receive status change of display 211 corresponding to AVRCP Controller 209. Alternatively, an "expire" parameter may be introduced to reduce AVRCP Subscribe messages. Furthermore, AVRCP notifications may be appended with A2DP messages. Specific time notification can be offloaded to and handled by the BT controller 109 of AVRCP TG 101.

Numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. An electronic device comprising:
    circuitry configured to:
        stream content to another electronic device via a wireless connection between the electronic device and the another electronic device;
        control reproduction of the content streamed to the another electronic device based on control messages received from the another electronic device;
        transmit, to the another electronic device, at a first frequency, first messages indicating a status of streaming the content from the electronic device to the another electronic device prior to receiving a notification from the another electronic device indicating a change in operational status of the another electronic device;
        receive the notification from the another electronic device indicating the change in the operational status of the another electronic device; and
        transmit, to the another electronic device, at a second frequency, which is less than the first frequency, second messages indicating the status of streaming the content from the electronic device to the another electronic device in response to the notification received from the another electronic device.

2. The electronic device of claim 1, wherein the notification indicating the change in operational status of the another electronic device is comprises an indication that the another electronic device will not transmit control messages for a predetermined period of time.

3. The electronic device of claim 1, wherein the notification indicating the change in operational status of the another electronic device is an indication that the another electronic device, or a component of the another electronic device, has been turned off or entered a sleep mode.

4. The electronic device of claim 1, wherein the circuitry includes at least a host processor and a second processor configured to control the wireless connection between the electronic device and the another electronic device.

5. The electronic device of claim 4, wherein the host processor is configured to offload processing to the second processor configured to control the wireless connection in response to the notification received from the another electronic device.

6. The electronic device of claim 5, wherein the processing offloaded to the second processor includes the transmitting the first and second messages indicating the status of the streaming at the first and second frequencies.

7. The electronic device of claim 1, wherein the streamed content is audio content, and the control messages include at least one of a request for playback position, a request for playback status, a request for track change, a request for a volume change and a request to play a playlist.

8. The electronic device of claim 1, further comprising:
    a display, wherein
    the circuitry is configured to control the electronic device to enter a sleep state during streaming of the content while a state of the display is off.

9. The electronic device of claim 1, wherein the circuitry is configured to send a request notification message of an event to the another electronic device.

10. The electronic device of claim 9, wherein the circuitry is configured to enter a sleep state during streaming of the content when a response to the request notification message is a response notification message related to occurrence of the event.

11. The electronic device of claim 10, wherein the response notification message indicates that that the another electronic device, or a component of the another electronic device, has been turned off or entered a sleep mode.

12. The electronic device of claim 1, wherein the content is audio content, the control messages include Audio Video Remote Control Profile (AVRCP) compliant control messages received according to an Audio/Video control Transport Protocol (AVCTP), and the circuitry is configured to stream the content directly to the another electronic device on an L2CAP channel via a short-range wireless connection between the electronic device and the another electronic device.

13. The electronic device of claim 1, wherein the circuitry is configured to stream the content to the another electronic device directly via a Bluetooth connection between the electronic device and the another electronic device.

14. A semiconductor device comprising:
    circuitry configured to:
        receive, via an electronic device, content streamed from another electronic device via a wireless connection between the electronic device and the another electronic device;
        transmit control messages to the another electronic device to control reproduction of the content streamed from the another electronic device;
        receive, from the another electronic device, at a first frequency, first messages indicating a status of streaming the content from the another electronic device before transmission of a notification to the another electronic device indicating a change in operational status of the electronic device;
        transmit the notification to the another electronic device indicating the change in operational status of the electronic device; and
        receive, from the another electronic device, at a second frequency which is less than the first frequency, second messages indicating the status of streaming the content from the another electronic device to the electronic device in response to the transmitted notification.

15. The semiconductor device of claim 14, wherein the notification indicating the change in operational status of the another electronic device is an indication that the another electronic device, or a component of the another electronic device, has been turned off or entered a sleep mode.

16. The semiconductor electronic device of claim 14, wherein
the content is audio content,
the control messages include Audio Video Remote Control Profile (AVRCP) compliant control messages transmitted according to an Audio/Video control Transport Protocol (AVCTP), and
the circuitry is configured to receive the content streamed from the another electronic device directly on an L2CAP channel via a short-range wireless connection between the electronic device and the another electronic device.

17. The semiconductor device of claim 14, wherein the notification comprises an indication that the electronic device will not transmit the control messages for a predetermined period of time.

18. A method comprising:
receiving, by an electronic device, content streamed from another electronic device via a wireless connection between the electronic device and the another electronic device, wherein the content comprises audio content and the content is received from the another electronic device directly on a logical link control and adaptation protocol (L2CAP) channel via a short-range wireless connection between the electronic device and the another electronic device;
transmitting control messages to the another electronic device to control reproduction of the content streamed from the another electronic device, the control messages including audio video remote control profile (AVRCP) compliant control messages transmitted according to an audio/video control transport protocol;
transmitting a notification to the another electronic device indicating a change in operational status of the electronic device; and
receiving, from the another electronic device, at a reduced frequency, messages indicating a status of streaming the content from the another electronic device to the electronic device in response to the transmitted notification.

19. The method of claim 18 further comprising:
receiving from the another electronic device, at a first frequency, first messages indicating a status of streaming the content from the another electronic device to the electronic device before transmission of the notification.

20. The method of claim 19, further comprising:
receiving, from the another electronic device, at a second frequency, which is less than the first frequency, second messages indicating the status of streaming the content from the another electronic device to the electronic device in response responsive to transmitting the notification.

\* \* \* \* \*

UNITED STATES PATENT AND TRADEMARK OFFICE
CERTIFICATE OF CORRECTION

| | | |
|---|---|---|
| PATENT NO. | : 11,310,735 B2 | Page 1 of 1 |
| APPLICATION NO. | : 16/674006 | |
| DATED | : April 19, 2022 | |
| INVENTOR(S) | : Raghavendra Ramappa et al. | |

It is certified that error appears in the above-identified patent and that said Letters Patent is hereby corrected as shown below:

On the Title Page

Item (57) Line 9: Replace "sleep stale" with --sleep state--.

In the Claims

Column 8, Line 28 (Claim 11): Remove "that" after --that--;

Column 16, Line 30 (Claim 20): Remove "responsive" after --response--.

Signed and Sealed this
Twentieth Day of August, 2024

*Katherine Kelly Vidal*

Katherine Kelly Vidal
*Director of the United States Patent and Trademark Office*